(12) United States Patent
Baker

(10) Patent No.: US 6,186,883 B1
(45) Date of Patent: Feb. 13, 2001

(54) CLIMATE CONTROL ARRANGEMENT AND A METHOD OF CONTROLLING THAT ARRANGEMENT

(75) Inventor: Roger Keith Baker, Solihull (GB)

(73) Assignee: Rover Group Limited, Warwick (GB)

( * ) Notice: Under 35 U.S.C. 154(b), the term of this patent shall be extended for 0 days.

(21) Appl. No.: 09/312,722

(22) Filed: May 17, 1999

(30) Foreign Application Priority Data

May 28, 1998 (GB) .................................................. 9811443

(51) Int. Cl.$^7$ .................................................. B60H 13/02
(52) U.S. Cl. .................................................. 454/75; 237/2 A
(58) Field of Search .............................. 237/2 A, 12.3 R; 165/42, 31; 454/75

(56) References Cited

U.S. PATENT DOCUMENTS

| 4,417,618 | 11/1983 | Yoshimi et al. . |
| 4,460,036 | 7/1984 | Yoshimi et al. . |
| 4,562,954 | 1/1986 | Kajita . |
| 4,852,798 | 8/1989 | Ito et al. . |
| 5,626,186 | 5/1997 | Honda et al. . |

Primary Examiner—Harold Joyce
Assistant Examiner—Derek S. Boles
(74) Attorney, Agent, or Firm—Davis and Bujold

(57) ABSTRACT

A climate control arrangement in which an existing automatic climate control system is adapted by an indicator quotient (TOA). A controller adjusts air duct distribution so that differential proportions of air flow can be presented to fixed air duct vents at respective height level HL, FL relative to an occupant of a motor vehicle. The indicator quotient (TAO) being determined by appropriate comparison of objective temperature, actual temperature and environmental temperature and is used by the controller for consistent occupant preferred air flow distribution between normal conditions and more extreme environmental conditions. Thus, occupant preferences for air flow distribution in normal Spring or Autumn type environmental conditions are adapted for more extreme Winter and Summer conditions without iterative and constant variation by that occupant.

5 Claims, 2 Drawing Sheets

CLIMATE CONTROL ARRANGEMENT AND A METHOD OF CONTROLLING THAT ARRANGEMENT

FIELD OF THE PRESENT INVENTION

Figure 1:
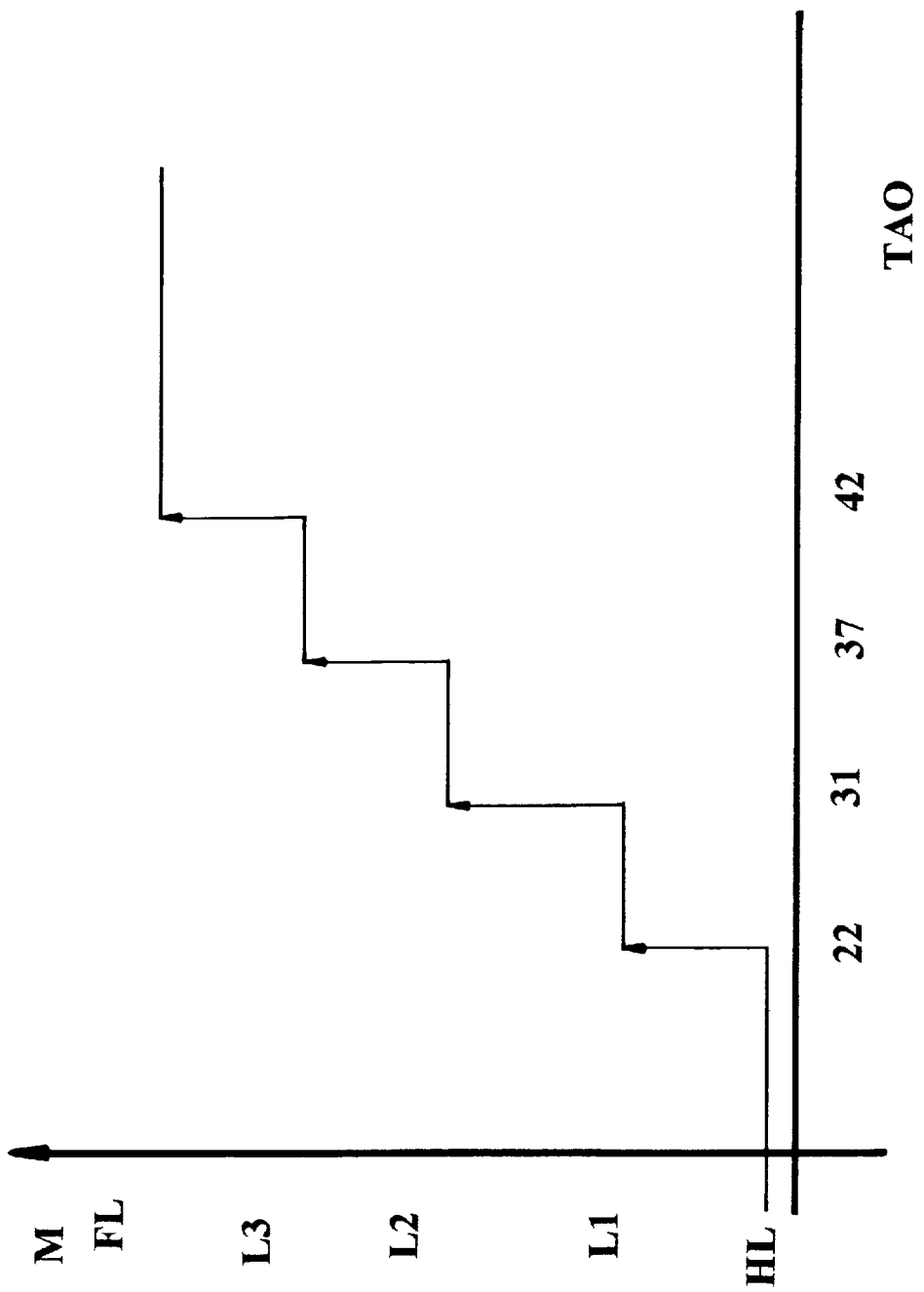

The present invention relates to a climate control arrangement for a motor vehicle and more particularly to such an arrangement used with a multiple projection vent height combination and control of such an arrangement with manual over-ride to the arrangement.

BACKGROUND OF THE PRESENT INVENTION

Typically within a motor vehicle there is provided a ventilation system through which air flows can be directed towards occupants of that vehicle. These air flows may be chilled or heated as required by the occupants. In broad terms, it is normal for such ventilation systems to present air flows at respective heights directed towards the occupants of the vehicle. Such systems are termed bi-level and present respective air flows to occupant torso and foot areas.

Provision of automatic adjustments for the climate within a motor vehicle is becoming common. Thus, air conditioning systems will heat or cool air projected into the motor vehicle cabin in order to adapt the climate therein. Furthermore, air conditioning systems can act as dehumidifiers in order to inhibit misting of windows, etc. Such automatic climate control systems compare actual vehicle cabin temperature with desired vehicle cabin temperature in relation to current ambient temperature about the vehicle and other information indicative of environmental conditions. Thus, in most automatic climate control systems, when in automatic mode, air flow distribution between projection heights is varied in accordance with a predetermined target air outlet (TAO) relation which considers the previously mentioned parameters.

Inherently, most users, i.e. the occupants of the motor vehicle, have individual preferences for respective air flow rates and distributions which cannot be accommodated through generalised predetermined relations identified by the motor vehicle manufacturer. Thus, the automatic climate control system will include a manual override to allow that occupant of the motor vehicle to select their individual preferences for air flow rates and distribution in accordance with current conditions and mood.

Unfortunately, such manual selection of air distribution and flow rates typically provides for a simple fixed proportion ratio level between air flow projection vent heights. Thus, in a bi-level system there will be fixed 50/50 air flow mix between a head height and a foot height directed towards occupants of a motor vehicle. Such fixed split is acceptable during mild conditions such as prevalent during Spring and Autumn. However, in more extreme conditions, prevalent in Winter or Summer, this fixed split may be unacceptable or, at least, be significantly different from that expected by the occupant. In such circumstances, in Winter there is too much air flow towards the face whilst too little towards the feet, whilst in Summer air flow to the face is insufficient for comfort. Thus, an uncomfortable occupant of a motor vehicle will tend to constantly change the temperature control arrangement settings in order to achieve a comfortable condition. Such repetitive alteration in the climate control system will typically diminish overall efficiency of that system along with creating potentially unsafe and irritable driving conditions for the occupant of the vehicle.

OBJECTIVE OF THE PRESENT INVENTION

It is an object of the present invention to provide a climate control arrangement for use within a motor vehicle having an automatic climate control system with a manual override. Thus, the arrangement can accommodate individual motor vehicle occupant preferences whilst retaining adaptability to facilitate flexible response to such preferences in terms of air flow rate and distribution from the climate control system.

BRIEF SUMMARY OF THE PRESENT INVENTION

In accordance with the present invention there is provided a climate control arrangement for a motor vehicle, the arrangement comprising manual operation means and a controller for air distribution means and air duct means arranged to present air flows at two vent heights, the controller determining an indicator quotient (TOA) dependent upon objective temperature, environmental temperature and current temperature compared in accordance with a pre-determined relationship, the controller normally using the indicator quotient (TOA) to variously control that air distribution means to achieve a desired climate, the manual operation means being coupled to the controller to alter operation of that controller when activate to ensure a substantially fixed air flow proportion ratio is provided for a respective indicator quotient (TOA) value between the respective vent heights through the air duct means irrespective of the desired climate objective The control means may also compare under said predetermined relationship solar load and/or other factors to determine the indicator quotient (TOA).

Typically, the air duct means will comprise separate first and second vents at respective vent height levels. Said first vent being arranged to project air flows towards an occupant's head and/or upper torso whilst said second vent is arranged to project air towards an occupant's feet.

The predetermined relationship may take the form of an algorithm along the lines of:

Indicator quotient $(TAO) = Ks.Ts - Kr.Tr - Kam.Tam - Kso.Tso + C$ wherein:
K=correction constant
C=correction factor
T=temperature
s=desired or objective set
r=actual or current
am=environmental or exterior
so=solar load.

The indicator quotient (TAO) will typically be high (positive) where there is air warming whilst low (negative) where air temperature is cooled, both in comparison with air inlet temperature whether that air is taken from the cabin or the exterior of the vehicle or a combination of both.

DESCRIPTIONS OF THE DRAWINGS

Figure 2:
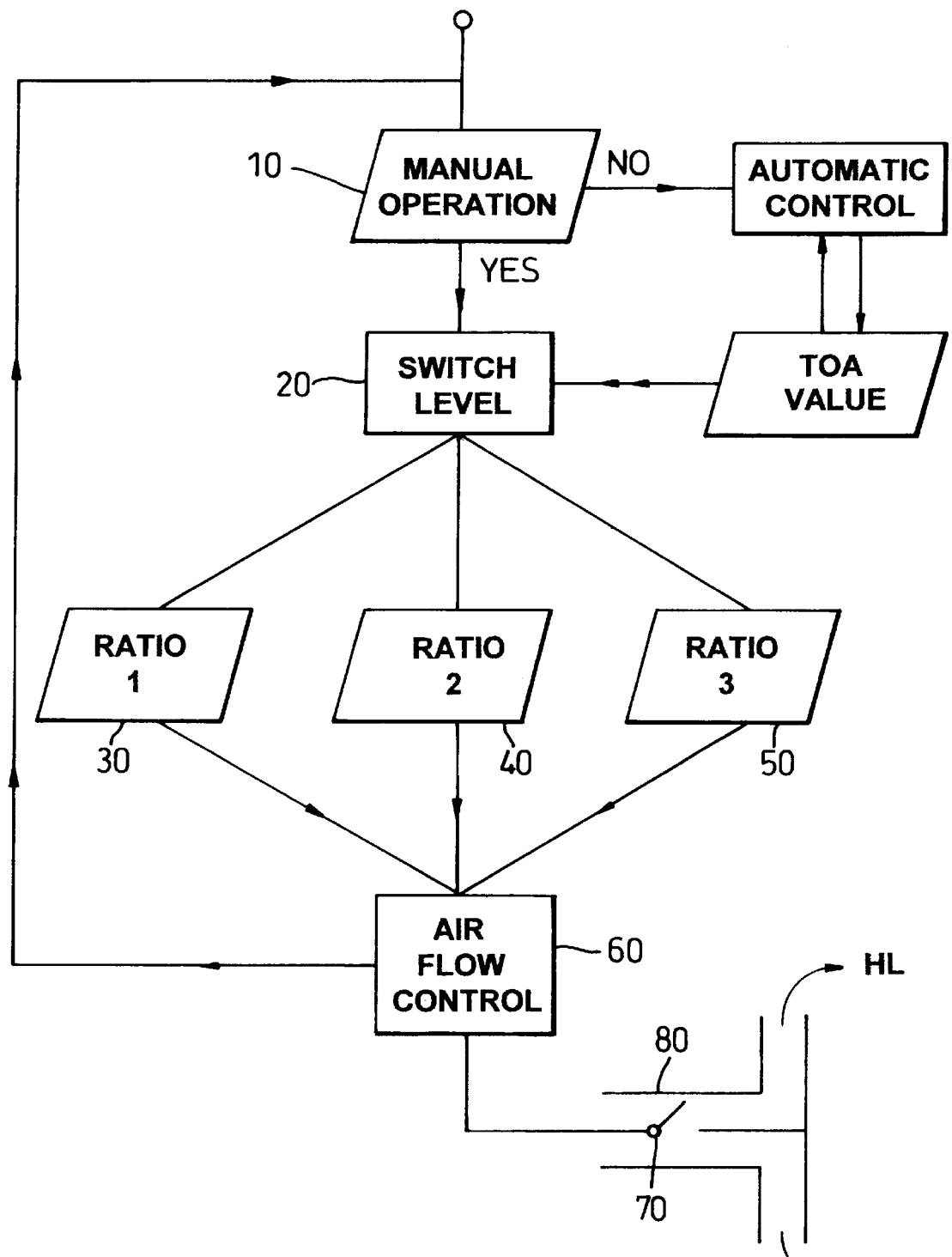

The present invention will now be described by way of example only with reference to the accompanying drawings, in which:

FIG. 1 is a graphic representation of air flow proportion ratio levels relative to height level projection of a bi-level air vent system in response to an indicator quotient; and, FIG. 2 is a rudimentary flow diagram illustrating specific features of the method of control of a climate control arrangement.

SPECIFIC DESCRIPTION OF THE EMBODIMENTS OF THE PRESENT INVENTION

As indicated above, a motor vehicle can include an automatic climate control system to determine vehicle cabin temperature, humidity and vent air circulation, etc. Such automatic climate control systems typically include a so-called target air outlet (TAO) value generated from a predetermined algorithm. This target air outlet value (TAO) in accordance with the present invention is defined as an indicator quotient for the present control arrangement. Normally, the target air outlet value (TAO) is defined as follows:

$TAO=Ks.Ts-Kr.Tr-Kam.Tam-Kso.Tso+C$, wherein
Ks=a corrective constant for the objective or set temperature determined by a motor vehicle occupant,
Ts=the desired or objective temperature of the motor vehicle occupant,
Kr=correction constant for actual temperature within the motor vehicle cabin,
Tr=actual temperature within the vehicle cabin,
Kam=correction constant for external or ambient temperature about the motor vehicle,
Tam=external or ambient air temperature,
Kso=correction factor for solar load presented to the motor vehicle cabin,
Tso=solar load temperature, and
C=correction factor for the TAO in a particular installation.

As indicated above, the TAO is the indicator quotient value resulting from the above algorithm is predetermined for a particular installation of the climate control arrangement. Thus, the actual algorithm or equation used may be tuned by a motor vehicle manufacturer in accordance with expected operational or environmental conditions, i.e. temperate or tropical climate conditions.

In an automatic climate control system, the TAO value is used to set and vary the air flow rate, air flow projection, degree of temperature alteration to air flow, degree of dehumidification of the air flow and other operational apparatus within the climate control system. However, as indicated above such automatic control systems suffer from the inherent diversity of individual motor vehicle occupant preferences with regard to convenient temperature and ventilation within a motor vehicle cabin. Thus, a manual override to the automatic control is provided to allow that occupant to determine their own climate through air flow rate and distribution presented through different height level vents within the motor vehicle. The other functional elements of the climate control arrangement are normally or generally still automatically controlled. Typically, the manual override will offer a fixed 50/50 air flow split between respective vent projections towards an occupant's head height level HL and foot level FL. The occupant may then additionally vary distribution and presentation of the air flow through selectively opening, fully or partially, air vent baffle valves to allow air flows into the cabin.

Unfortunately, such a 50/50 split between the head level HL and the feet level FL may be acceptable during mild environmental conditions typical during Spring or Autumn, but unacceptable during more extreme environmental conditions typical of Winter or Summer even though manual control settings may be the same as perceived by the vehicle occupant.

In accordance with the present invention, a manual, multi-level vent presentation arrangement is used such that the indicator quotient or TAO value from the automatic mode is used to proportion the air flow rate between each vent height level in accordance with prevailing conditions. Thus, the motor vehicle occupant can utilise the manual override selection facility whilst the climate control arrangement adapts that choice to current, seasonal conditions or 15 parameters. In such circumstances, it will be appreciated that:

1) during cool conditions, such as Winter, the majority of air flow could be directed to the foot level FL with a bleed or radically diminished air flow rate to the head level HL;

2) during moderate conditions, such as Spring and Autumn, the air flow will be as intended by the manual override, that is to say substantially a 50/50 split between the head level HL and the foot level FL;

3) during warm conditions, such as Summer, the majority of air flow will be directed towards the head level HL whilst there will only be a limited or bleed air flow to the foot level FL.

Although the air duct vents are consistent with the typical manual override configuration of a 50/50 air flow, the air duct distribution means controlled by the arrangement is adjustable to regulate the air flow rate into each respective height level HL, FL in accordance with prevailing indicator quotient TAO values.

In FIG. 1 of the drawings, the proportion M of air flow directed to respective vent height levels is plotted against indicator quotient (TAO) provided from the re-determined relationship of the climate control arrangement. Thus, it can be seen that the indicator quotient TAO at specific value levels adjusts the proportion of air flow directed to each fixed vent height level HL, FL accordingly.

With an indicator quotient (TAO) value below 22, a controller of the climate control arrangement directs substantially all of the air flow to the foot level, whilst at a value greater than 42 substantially all of the air flow is directed towards the head level HL vent ducting. It will be appreciated that air volume distribution is an integral below the graphic line rather than a differential of that graphic line.

Inherently, between the head level H-L and the foot level FL, there are intermediate ratio levels, L1, L2, L3 which proportion air flow to each vent ducting at head level HL and foot level FL. The number of intermediate ratio levels can be varied in accordance with performance requirements and sophistication. Furthermore, rather than a bi-level system, it will be appreciated that more vent height levels for presentation to an occupant may be provided within the climate control arrangement with varying air flow proportioning ratio levels by the air duct distribution system between the multiplicity of vent heights.

The air duct distribution system may comprise a simple baffle value or gate valve arranged to distribute air flow from a central source proportionately in accordance with the indicator quotient (TAPO) determined on the basis described above. These baffle or gate valves may be orientated through feed back servo motors controlled by a controller responsive to the indicator quotient TAO.

It will be appreciated that in accordance with the present invention, an occupant of a motor vehicle is allowed to manually select air distribution, i.e. a fixed 50:50 air flow split, but the control arrangement implicitly adapts that manual override to a more logical presentation of air flow at respective levels, HL, FL more appropriate for prevailing environmental conditions. Thus, the occupant of the motor vehicle will still perceive an individual preference to climate ventilation within the motor vehicle which is consistent throughout the range of environmental temperature conditions inherent through a year life cycle of a vehicle. In such circumstances, the occupant of the vehicle will not need to radically or iteratively adjust the manual override settings to accommodate for the day-to-day or season-to-season variations in their individual preference for climate within the vehicle. Less manual interfering or constant changing of the climate control arrangement will improve driver concentration and may promote more efficient operation of the climate control arrangement.

Typically, the relationship to provide the indicator quotient (TAO) for the climate control arrangement will be installed by a motor vehicle manufacturer upon production of a vehicle. Thus, that manufacturer will be able to determine the appropriate relationship or algorithm for the expected market to which the vehicle will be supplied. However, it will be appreciated by those skilled in the art that the relationship may be adjusted over time in order to accommodate variations in the requirements of the occupant or ageing of components within the climate control arrangement. For example, the air flow rate is dependent upon the blower fan provided within the climate control arrangement and the efficiency of this fan may diminish with age. Furthermore, any filtration means used within the climate control arrangement will tend to clog with similar diminution in air flow rate. Such changes in system component performance may be accommodated through adaptation of the predetermined relationship algorithm (see above) over time to provide the TAO, either absolutely or since last filter replacement or regeneration.

The pre-determined relationship utilised by a controller of the control arrangement to determine the indicator quotient (TAO) can include consideration of a wide range of factors. However, principally, it is the objective temperature that the vehicle occupant requires, the actual temperature within the vehicle cabin and the external environmental temperature about the cabin which are the principal parameters for determination of the indicator quotient TAO. However, as indicated in the algorithm described above, other factors such as solar load, i.e. the effect of sunlight radiating upon the vehicle cabin, can be incorporated into the relationship in order to adjust and adapt the indicator quotient TAO utilised by the controller to adapt the air duct distribution means to present air flows to respective height levels HL, FL constituted by respective air duct vents.

Effectively, the air duct vents at their respective vent height levels HL, FL to a motor vehicle occupant are fixed. However, in accordance with the present climate control arrangement, a proportion of air flow directed to each of these fixed vent height levels HL, FL is adapted in accordance with prevailing environmental conditions, i.e. season. In essence, the occupant of the vehicle determines for their median or moderate environmental conditions, such as Autumn or Spring, their preferred air flow and distribution regime and the controller adapts, through the air distribution means, these preferences to the more extreme conditions prevalent in Winter or Summer or somewhere between without that occupant manually and repeatedly varying air flow or distribution to achieve that preferred regime. Alternatively, the preferences could be determined in Winter or Summer conditions and adapt to Spring or Autumn conditions.

The more intermediate distribution ratio levels, i.e. L1, L2, L3 (FIG. 1) that are provided then the more responsive will be the climate control arrangement. Thus, day-to-day variations in environmental conditions within the more general variation between the extremes of Summer/Winter and the median or normal condition of Autumn/Spring will be more easily accommodated. More intermediate ratio levels L1, L2, L3 provides a more discrete response to each prevalent environmental condition.

Those skilled in the art will be fully familiar with operation of automatic climate control arrangements based upon determination of an indicator quotient (TOA). However, the quotient (TOA) in prior arrangnments is used to control cabin temperature rather than in the present invention to alter a manual preference. Thus, in the present invention, the best approach to achieve cabin temperature by variation of air distribution as part of the climate control arrangement elements attempting to achieve a desired cabin climate is over-ridden by manual operation for occupant preferred air flow presentation. However, that preference is adapted by reference to the indicator quotient (TOA) for consistency over the Seasons and day-to-day environmental changes.

The normal climate control arrangement regime is disabled with regard to air flow distribution but the TOA value used to determine which fixed air flow distribution ratio is used for a particular manual preference of air flow presentation at two or more duct vent heights, such as HL, FL.

FIG. 2 of the drawings depicts a rudimentary flowchart of the method of control for the present climate control arrangement. The flowchart is relatively simple. Thus, initially manual operation is determined at step 10 and if the result is No then automatic control of the climate control arrangement is continued. If manual operation is selected then the switch level is determined at step 20.

It will be appreciated that, normally there will only be one switch level, typically 50:50 as described previously. In such circumstances, step 20 most importantly combines the current indictor quotient (TOA) value with manual operation to provide an air flow distribution ratio level 30, 40, 50 appropriate to those conditions. This ratio level 30, 40, 50 is communicated to control an air flow control module 60 which controls an air distribution flap mechanism 70 in an air duct arrangement 80. This duct arrangement 80 distributes air flows in the determined ratio 30, 40, 50 to the two different vent height levels HL, FL.

It will be understood that the air flow control module normally includes a time-out feature which periodically refreshes the determination of the air flow ratio level 30, 40, 50 determination at step 20.

The above method of operation will normally be incorporated into the controller of automatic climate control arrangement or system.

What is claimed is:

1. A climate control arrangement for a motor vehicle, the arrangement comprising manual operation means and a controller for air distribution means and air duct means arranged to present air flows at two vent heights, the controller determining an indicator quotient (TOA) dependent upon objective temperature, environmental temperature and current temperature compared in accordance with a pre-determined relationship, the controller normally using the indicator quotient (TOA) to variously control that air distribution means to achieve a desired climate, the manual operation means being coupled to the controller to alter operation of that controller when activate to ensure a substantially fixed air flow proportion ratio is provided for a respective indicator quotient (TOA) value between the respective vent heights through the air duct means irrespective of the desired climate objective.

2. An arrangement as claimed in claim 1, wherein the controller is also dependent upon solar load in order to determine the indicator quotient (TOA).

3. An arrangement as claimed in claim 1, wherein the air duct means comprises separate air vents, a first air vent being arranged to project air flow at a first vent height level whilst a second air vent is arranged to propel air flow at a second vent height level.

4. A climate control arrangement as claimed in claim 3, wherein the first vent height level is directed, in use, to a head or upper torso of an occupant of a motor vehicle, whilst the second vent height level is directed to a foot level of an occupant of a motor vehicle.

5. A motor vehicle including a climate control arrangement comprising manual operation means and a controller for air distribution means and air duct means arranged to present air flows at two vent heights, the controller determining an indicator quotient (TOA) dependent upon objective temperature, environmental temperature and current temperature compared in accordance with a pre-determined relationship, the controller normally using the indicator quotient (TOA) to variously control that air distribution means to achieve a desired climate, the manual operation means being coupled to the controller to alter operation of that controller when activate to ensure a substantially fixed air flow proportion ratio is provided for a respective indicator quotient (TOA) value between the respective vent heights through the air duct means irrespective of the desired climate objective.

* * * * *